United States Patent [19]

Steiger et al.

[11] 4,210,329
[45] Jul. 1, 1980

[54] VIDEOGAME WITH MECHANICALLY DISJOINT TARGET DETECTOR

[75] Inventors: Klaus Steiger, Unterrodach; Peter Wahl, Coburg, both of Fed. Rep. of Germany

[73] Assignee: Loewe-Opta GmbH, Kronach, Fed. Rep. of Germany

[21] Appl. No.: 854,229

[22] Filed: Nov. 23, 1977

[30] Foreign Application Priority Data

Nov. 23, 1976 [DE] Fed. Rep. of Germany ....... 2653113

[51] Int. Cl.² .............................................. A63F 9/02
[52] U.S. Cl. .................................... 273/313; 273/312; 273/DIG. 28
[58] Field of Search ............. 35/9 C, 48 R; 273/85 G, 273/101.1, 101.2, DIG. 28; 340/323 R, 324 AD; 358/142, 93

[56] References Cited

U.S. PATENT DOCUMENTS

| | | | |
|---|---|---|---|
| 3,151,248 | 9/1964 | Glaser et al. | 273/DIG. 28 |
| 3,189,889 | 6/1965 | Bridgett | 340/324 A |
| 3,416,243 | 12/1968 | Greenberg et al. | 35/48 R |
| 3,588,108 | 6/1971 | Ormiston | 273/101.1 |
| 3,599,221 | 8/1971 | Baer | 273/101.1 |
| 3,728,480 | 4/1973 | Baer | 273/101.2 |
| 3,811,204 | 3/1974 | Marshall et al. | 273/101.1 X |
| 3,835,553 | 9/1974 | Kirton et al. | 35/9 C |
| 3,921,161 | 11/1975 | Baer | 273/85 G |
| 3,993,861 | 11/1976 | Baer | 358/142 |
| 4,026,555 | 5/1977 | Kirschner et al. | 273/85 G |
| 4,111,421 | 9/1978 | Mierzwinski | 273/85 G |

OTHER PUBLICATIONS

*Elektor,* "Score on Screen for TV Games", Oct. 1976, pp. 1008–1012.
*Elektor,* "Digits on TV", Oct. 1976, pp. 1034–1039.
*Electronics,* "Games", Jun. 24, 1976, pp. 89–96.

*Primary Examiner*—Vance Y. Hum

[57] ABSTRACT

A target videogame employing a screen with a moving light spot symbol and a mechanically disjoint target detector. Signals generated by light received in the target detector and by discharging a trigger attached to the target detector are transmitted by wireless communication to the circuits providing for the screen display.

13 Claims, 3 Drawing Figures

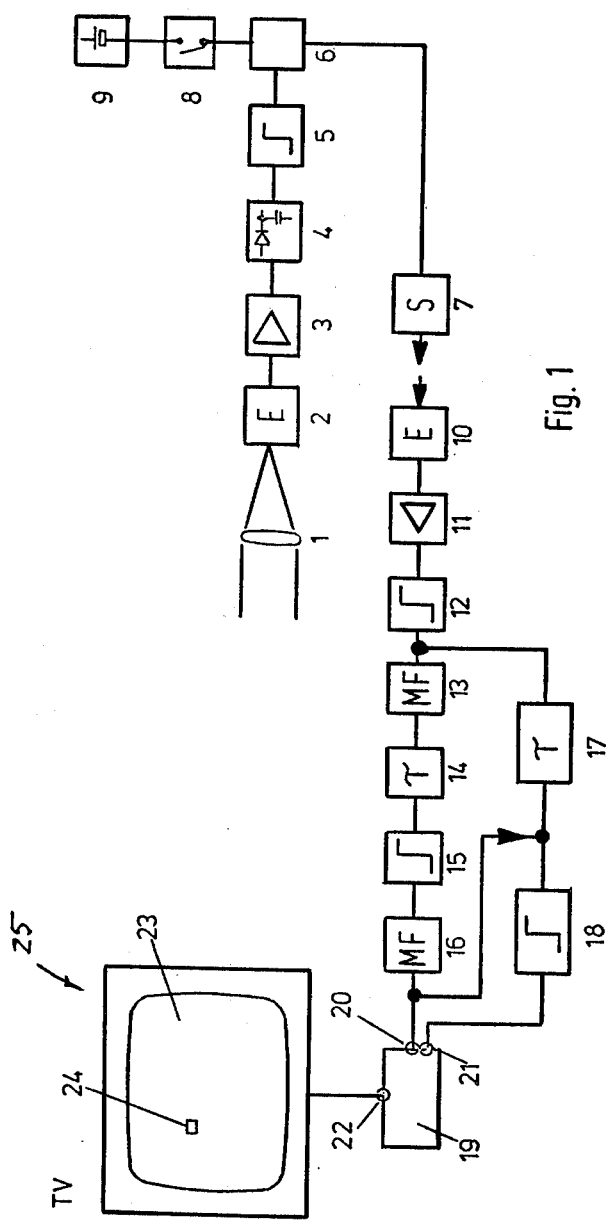
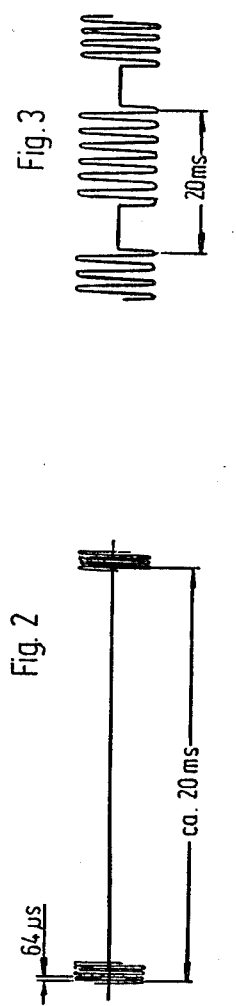

VIDEOGAME WITH MECHANICALLY DISJOINT TARGET DETECTOR

BACKGROUND OF THE INVENTION

1. Field of the Invention

A videogame involving a light spot symbol on a screen and a target detector to be directed toward the moving spot and having a trigger.

2. Description of the Prior Art

It is known to provide in videogames an arrangement where a light spot moves on a television screen which can be shot down with an optical electronic target detector. The optical electronic detector can be shaped as a pistol, or as a rifle. This can be done by having a target detector incorporating a diode which upon coincidence between direction of the target detector and of the moving light spot, generates an electrical signal. A simultaneous operation of a trigger finger or arm pivotally mounted in the target detector, causes a light beam to be emitted therefrom which when hitting the light spot extinguishes it and a hit is then counted.

The television screen displays the number of times the trigger arm is operated to emit a shot and the number of hits that are achieved.

In general a cable is provided for an electrical connection of the target detector and the television screen serving as a playing field. The cable can transfer the coincidence signals for counting the hits, the operations of the trigger resulting in shots missing the target, and the signals for controlling the disappearance of the light spot.

One of the drawbacks of the aforedescribed videogames resides in that the player can only be seated at a maximum distance from the television screen which is limited by the length of the cable. When several players use the videogame, it is cumbersome to handle because of its attachment to a cable, especially when handing the target detector from person to person. The cable is also unwieldy when transporting and storing the videogame. Furthermore, the possibility of a faulty cable connection is also present. Another disadvantage resides in the susceptibility of the device to malfunction due to extrinsic light collected by the photodiode, e.g. by daylight or by the light emitted from an electric bulb fed with 60 Hz line current. Therefore, in a bright room or when the target detector is directed toward an external light source it cannot be excluded that with simultaneous operation of the trigger a coincidence is found and a hit recorded, although the target detector is not directed towards the moving light spot on the screen.

SUMMARY OF THE INVENTION

1. Purposes of the Invention

It is an object of the invention to provide a target detector which is not susceptible to register a hit due to external light sources, that is a light source other than the light spot on the screen. It is another object of the invention to provide a target detector which responds only to the light emitted from the light spot on the screen.

It is another object of the invention to provide a video game with a target detector, which operates without a mechanical connection between the target detector and the screen.

It is another object of the invention to provide a videogame which counts as hits only coincidences of a trigger generated pulse with a pulse generated by the light acting on a photodiode in the target detector.

2. Brief Description of the Invention

The present invention provides a videogame which comprises a television receiver and a circuit for generating one or more movable light spots on a line scanned screen and a target detector directable to the moving light symbol. The television receiver incorporates an oscillator for generating horizontal synchronizing signals and an oscillator for generating vertical synchronizing signals. A switching means provides for bright illumination of a defined section of horizontal and vertical sawtooth waveforms and this section being synchronized for generating a time proportional pulse. The pulses are received by a coincidence gate and then are conducted to a summation circuit which synchronizes them with synchronizing and output signals being emitted from additional coincidence gates. The summation circuit is then connected to color and video amplifying stages of the television receiver. The target detector incorporates an optical sensor for receiving light energy emitted from the light spot symbol on the screen. A manual trigger arm or finger is attached to the target detector for controlling an electrical switch. The shots, which occur when the trigger arm is actuated, are counted and the hits are counted separately when there is a coincidence between a shot and the entering of light energy from the light spot into the optical sensor in a counting stage connected to the television receiver. A wireless communication means is provided between the target detector and the counting stage for transferring pulses resulting from discharging the trigger arm and for pulse signals generated depending on the light received from the light spot symbol. The wireless communication means can be provided by infrared emitters and detectors, ultrasonic transmitters and detectors and the like.

The invention accordingly consists in the features of construction, combination of elements and arrangement of parts which will be exemplified in the devices hereinafter described and of which the scope of the application will be indicated in the appended claims.

BRIEF DESCRIPTION OF THE DRAWING

In the accompanying drawing in which is shown one of the various possible embodiments of the invention:

FIG. 1 is a view of a diagram of circuit blocks for a videogame having a mechanically disjoint target detector;

FIG. 2 is a view of signals generated by light pulse groups emitted from the screen; and FIG. 3 is a view of signals emitted from the target detector.

DETAILED DESCRIPTION OF THE PREFERRED EMBODIMENTS

Referring now to FIG. 1 there is shown a block diagram of a videogame comprising a target detector 1 to 9 and a display system 10 to 25. The target detector comprises an optical system 1 for collecting the light energy emitted from the moving light spot symbol 24 on the picture screen 23. The collected light reaches an optical sensor. The optical sensor 2 can be a photosensor such as a photodiode, a photovoltaic detector, a photoconductive detector, a phototube and the like. The optical sensor is connected to a selective amplifier 3 which is followed by an envelope curve demodulator 4, which in turn is connected to a threshold switch 5 which is attached to a modulator 6. The trigger arm actuation turns a switch 8 which is connected to an electrical source 9. When the switch 8 is turned the modulator 6 generates oscillations which are modulated or unmodulated and which are fed to the transmitter stage 7, which transmits the signals to the detectors 10 of the television set. The transmitter can be an ultrasonic transmitter or an infrared emitter.

The target detector incorporating elements 1-9 can have various forms, which are suitable for aiming at a light spot such as a gun, pistol, a rifle, bow and arrow, telescope and the like.

The evaluation stage in the television receiver comprises a receiver 10 which is constructed to receive ultrasonic signals (microphone) or infrared signals (infrared detector), an amplifier 11, a threshold switch 12 for selecting and for hit recognition, a monoflop 13, a time delay element 14, a threshold switch 15 and another monoflop circuit 16, a time delay circuit 17 for recognition of shots and a threshold switch 18. The time delay circuit 17 is in a parallel branch to the hit recognition branch and in series with the threshold switch 18. The generator 19 for the videogame comprises an integrated counting circuit for hits and shots with an input 20 for counting the hits and with an input 21 for counting the shots and with an output 22 for the presentation of the corresponding numbers on the screen and for the generation of the moving light spot symbol 24 on the picture screen 23 of the television set 25.

The videogame generator 19 provides the signals for display of the number of hits and the number of shots and the signals for displaying the moving light spot symbol 24 on the picture screen 23.

The picture screen 23 radiates the light pulse groups with scanning line frequency of the television set with time intervals of the reciprocal of the scanning frame frequency resulting in pulse groups about every 20 msec. These pulse groups are diagrammatically shown in FIG. 2. The optical system 1 of the target detector when directed to the light spot symbol 24, projects a scaled down picture of the light spot symbol 24 onto the optical sensor 2 of the target detector. This optical sensor functions as an optical electronic converter and converts the light pulses received into corresponding electrical signals.

According to the invention these electrical signals are not fed directly to a coincidence circuit but are initially amplified in a selective amplifier 3 which is constructed for passing only pulses having scanning line frequency. This prevents continuous light and disturbing light from affecting the following demodulator circuit 4. The demodulator 4 is constructed as an envelope curve demodulator and generates from the selectively amplified signals pulses with scanning frame frequency of 60 Hz or the like depending on the television system employed. The pulses are shaped to square pulses in the following threshold switch 5.

When the switch 8 is turned the oscillator stage of the modulator 6 starts oscillating and these signals are transmitted through the transmitter stage 7 by modulation of an infrared or ultrasonic carrier frequency. When square pulses are provided by the threshold switch 5 to the modulator 6, the modulator 6 is switched on in the rhythm of the square pulses and its modulation is 100 percent. The resulting waveform is partially depicted in FIG. 3. This signal is also modulated by the infrared or ultrasonic carrier and transmitted by the transmitter 7.

For evaluation the signal is received by the receiver 10, which can be received by means of a suitable antenna or can be in the form of an infrared detector, and is amplified by an amplifier 11 and a following threshold switch 12 regenerates square pulses.

When a modulated signal is received representing a hit, in which case the time of turning the switch by the trigger arm and the time of signal reception in the optical sensor coincide, the monoflop 13 in the hit counting circuit is activated. The time element of the hit counting circuit is less than the reciprocal of the frame scanning frequency or about 20 msec and its output charges a condenser of the time delay element 14, which is preferably an RC circuit, which in turn, when reaching a preselected threshold, actuates the threshold switch 15, which in turn activates the following monoflop circuit 16 for providing a hit counting signal to the videogame generator 19.

When there is no coincidence between the signal obtained by sighting the light spot symbol on the picture screen with the target detector and the signal resulting from actuating the trigger arm and thereby the switch 8, then the transmitter transmits an unmodulated signal while the trigger is actuated. Since the monoflop circuit 13 provides in this case only short pulses of less than about 20 msec and which are insufficient to reach the threshold of the threshold switch 15, the hit counting circuit is not initiated. The arriving continuous signal charges a condenser in a time delay element 17 and controls through another threshold switch 18 the electronic counter for shot counting, which is incorporated within the videogame generator 19.

The videogame of the present invention employs preferably a coincidence circuit which is fed with a signal from the switch 8 turned by the trigger arm and a signal coming from the photosensor 2 of the target detector when impinged by the light energy coming from the moving light spot symbol 24 on the screen 23 and a coincidence of both signals is transmitted to the television display as a hit. It is also possible in the videogame to employ a first emitting stage for sending signals for counting to the counting stage when the trigger is actuated and the switch turned and a second emitting stage for sending signals for counting to the counting stage fed from the coincidence circuit for coinciding of trigger switch 8 generated pulses and of photoelectrical pulses generated when the target detector is directed toward the moving light spot symbol 24 on the screen 25.

When the moving light spot symbol 24 is modulated depending on scanning line and scanning frame frequency the videogame can comprise a switching circuit for frequency selection of electrical signals generated by the photosensor of the target detector when the target detector is directed toward the moving light spot symbol 24 on the screen 23 with the switching circuit having an output connected to the counting stage and providing a signal only if the electrical signals have the frequency of the scanning line. The videogame can employ a demodulator fed with scanning line frequency selected signals. Then a switching stage can follow the demodulator for generating pulses with scanning frame frequency. A coincidence stage compares the signal from the switching stage with the pulse resulting from the actuation of the trigger arm and the turning of the switch and providing signals to be emitted by the sending stage.

Alternatively the demodulator fed with scanning line frequency selected signals can be connected to a switching stage generating pulses with scanning frame frequency. In this case a modulator is connected to the trigger arm switch and this modulator provides either scanning line frequency or scanning frame modulated signals depending on the time of triggering or which provides a continuous signal during the time of actuation of the trigger if a selected signal is not present from the photosensor.

The communication means of the videogame can have an emitter attached to the target detector for emitting modulated and unmodulated signals. An input stage of the television set receives the signals from the emitter and is connected to a pulse regenerator which feeds the corresponding pulses to a hit and shot counter. The videogame can have an outputstage of the target detector for sending signals which are modulated by the frequency selected light pulses for a hit of the target and which are unmodulated for a direction missing shot. These signals are received by an input stage and fed to an amplification stage and then to a pulse converter stage for generating a pulse of a first duration for an incoming modulated signal and for generating a pulse of a second duration different from the first duration for an incoming unmodulated signal. The pulses coming from the pulse converter are fed to the counting and display stages for counting and displaying the occurrences of hits and shots.

The videogame may employ integration stages with different time constants to which the pulses from the pulse converters are fed and which provide a control signal when a pulse surpasses a defined threshold and which feed the control signal to the counting and display stages. The integration stage for storing the pulse corresponding to the modulated signal can comprise an input monoflop circuit with such a small time element that it is suitable for preventing the pulse derived from the unmodulated signal from being stored in the integrator.

For simultaneous counting of coincidence signals corresponding to hits and of signals corresponding to missing shots with a transmitted signal being modulated or unmodulated, respectively, the videogame may have the counter for the actuated shots being activated when a hit is counted. It thus will be seen that there is provided a device which achieves the various objects of the invention and which is well adapted to meet the conditions of practical use.

As various possible embodiments might be made of the above invention, and as various changes might be made in the embodiment set forth above, it is to be understood that all matter herein described or shown in the accompanying drawing is to be interpreted as illustrative and not in a limiting sense.

What is claimed is:

1. A videogame comprising:
   a television receiver
   a circuit for generating one or more movable light spot symbols on a line scanned screen of the television receiver;
   an oscillator for generating horizontal synchronizing signals;
   an oscillator for generating vertical synchronizing signals;
   switching means for bright illumination and scanning of a predetermined intersection of horizontal and vertical sawtooth waveforms and the intersection being synchronized for generating a time proportional pulse; a target detector directable to the moving light spot symbol;
   an optical sensor incorporated in the target detector for receiving light energy emitted from the light spot on the screen;
   a trigger arm attached to the target detector for controlling an electrical switch;
   an output stage comprising an emitter attached to the target detector and connected to the electrical switch and to the optical sensor for emitting unmodulated signals for a direction missing shot and modulated signals for a hit and a wireless transmission means for sending the signals from the emitter;
   an input stage for receiving signals sent by the output stage;
   an amplification stage for amplifying the signals coming from the input stage;
   a pulse converter stage connected to the amplification stage for generating a pulse of a first duration for an incoming modulated signal and of a second duration different from the first duration for an incoming unmodulated signal;
   a coincidence gate for receiving the pulses;
   a summation circuit receiving the output signals of the coincidence gate and synchronizing them with the synchronizing and output signals of additional coincidence gates; and
   a counting and display stage connected to the television receiver for counting the shots when the trigger arm is actuated and for counting the hits when there is a coincidence in time between the actuation of the trigger arm and the entering of light energy on the optical sensor coming from the light spot on the screen and for displaying the results thereof on said television receiver.

2. The videogame according to claim 1, comprising:
   a first emitting stage for sending signals for counting to the counting stage when the trigger is actuated and the switch turned; and
   a second emitting stage for sending signals for counting to the counting stage fed from the coincidence circuit for coinciding of trigger switch generated pulses and of photoelectrical pulses generated when the target detector is directed toward the moving light spot symbol on the screen.

3. The videogame according to claim 1, wherein the moving light spot symbol is modulated depending on the scanning line and scanning frame frequency comprising a switching circuit for frequency selection of electrical signals generated by the photosensor of the target detector when the target detector is directed toward the moving light spot symbol on the screen with the switching circuit having an output connected to the counting stage and providing a signal only if the electrical signals have the frequency of the scanning line.

4. The videogame according to claim 3, comprising:
   a demodulator fed with scanning line frequency selected light signals;
   a switching stage controlled by the demodulator and generating pulses with scanning frame frequency;
   a coincidence stage for comparing the signal from the switching stage with the pulse resulting from the actuation of the trigger arm and the turning of the switch and providing signals to be emitted by a transmitting stage.

5. The videogame according to claim 3, comprising:

a demodulator fed with scanning line frequency selected light signals;

a switching stage controlled by the demodulator and generating pulses with scanning frame frequency; and a modulator connected to the trigger arm switch which modulator provides either scanning line frequency or scanning frame modulated signals depending on the time of triggering or which provides a continuous signal during the time of actuation of the trigger if a selected signal is not present from the photosensor.

6. The videogame according to claim 3, comprising integration stages with different time constants to which the pulses from the pulse converters are fed and providing a control signal when the pulses surpass a defined threshold feeding the control signal to the counting and display stages for counting and displaying.

7. The videogame according to claim 6, wherein the integration stage for storing the pulse corresponding to the modulated signal comprises an input monoflop circuit with such a small time element suitable for preventing the pulse derived from the unmodulated signal from being stored in the integrator.

8. The videogame according to claim 1, wherein for simultaneous counting of coincidence signals corresponding to hits and of signals corresponding to direction missing shots a transmitted signal is modulated or unmodulated, respectively, and the counter for the shots is also selectively actuated when a hit is counted.

9. The videogame according to claim 1, wherein the optical sensor is a photodiode.

10. The videogame according to claim 1, wherein the wireless communication means is provided by infrared emitters and infrared detectors.

11. The videogame according to claim 1, wherein the wireless communication means is provided by ultrasonic transmitters and by ultrasonic receivers.

12. The videogame according to claim 1, wherein the target detector is shaped like a gun.

13. The videogame according to claim 1, wherein the target detector is shaped like a rifle.

* * * * *